United States Patent [19]
Viaud

[11] Patent Number: 5,163,544
[45] Date of Patent: Nov. 17, 1992

[54] FEED FORK APPARATUS FOR LARGE ROUND BALER

[75] Inventor: Jean Viaud, Sarreguemines, France

[73] Assignee: Deere & Company, Moline, Ill.

[21] Appl. No.: 717,156

[22] Filed: Jun. 18, 1991

[30] Foreign Application Priority Data

Jun. 18, 1990 [DE] Fed. Rep. of Germany ....... 4019337

[51] Int. Cl.⁵ ............................................. B65G 65/08
[52] U.S. Cl. ................................... 198/517; 198/740; 198/749; 56/341
[58] Field of Search ............... 198/517, 518, 740, 749; 56/341; 100/88

[56] References Cited

U.S. PATENT DOCUMENTS

| 2,744,617 | 5/1956 | Collier | 198/517 X |
| 2,775,339 | 12/1956 | Cadier | 198/740 |
| 3,156,346 | 11/1964 | McDuffie | 198/749 X |
| 3,914,926 | 10/1975 | Braunberger et al. | 198/518 X |
| 3,938,652 | 2/1976 | Sacht et al. | 198/517 X |
| 4,409,891 | 10/1983 | Naaktgeboren | 198/740 X |
| 4,580,398 | 4/1986 | Bruer et al. | |
| 4,662,275 | 5/1987 | Tertilt | 56/341 X |
| 4,819,418 | 4/1989 | Ratzlaff et al. | 56/341 |
| 4,993,217 | 2/1991 | Pfrimmer et al. | 56/341 |

FOREIGN PATENT DOCUMENTS 1141125 6/1963 Fed. Rep. of Germany .
1362069 4/1964 France .

Primary Examiner—D. Glenn Dayoan

[57] ABSTRACT

A large round baler is equipped with a pick-up and a feed fork apparatus which work together to gather crop from the ground and deliver it to the inlet of the bale forming chamber of the baler. The feed fork apparatus includes a plurality of teeth which are mounted to an eccentric located beneath a chute of the apparatus and are caused to sweep along an oval path in the direction of desired crop movement, the tines moving through respective slots provided in the chute. Leading edges of the tines are stair-stepped so that they engage the crop and carry it along the chute to the inlet to the bale forming chamber.

7 Claims, 2 Drawing Sheets

FEED FORK APPARATUS FOR LARGE ROUND BALER

BACKGROUND OF THE INVENTION

The present invention concerns a conveyor arrangement for harvesting machine, in particular for a baler, with a conveyor chute provided with slots and with conveyor teeth guided in the slots that emerge from the slots during the conveying process, and which exhibit a leading end face.

A known conveyor arrangement on a baler for the production or round bales (U.S. Pat. No. 4,580,398, granted Apr. 8, 1986) includes a conveyor chute penetrated by slots and upon which crop is moved from a conveyor, known as a "pick up" to a bale forming chamber area. A feed fork apparatus includes teeth which, during a feeding portion of their travel, protrude through the slots and perform a controlled movement, thereby transporting the crop. During the conveying process, the tips of the teeth move through a generally oval path, one of whose long sides is parallel to the surface of the conveyor chute.

The conveying action of these known feed fork teeth is not considered satisfactory under all conditions; moreover clogging can occur at the entrance to the bale forming chamber.

The problem underlying the invention is seen as that of proposing a conveyor arrangement of the type noted above, in which clogging is largely avoided.

SUMMARY OF THE INVENTION

According to the present invention, there is provided a baler having a crop conveyor structure of the type noted above but including feed fork teeth which operate in a satisfactory manner under most conditions.

A broad object of the invention is to provide teeth which are shaped so as to prevent the crop from sliding down leading faces thereof when the teeth are engaging crop which is being advanced upwardly along the chute by the action of the teeth.

More specifically, it is an object of the invention to provide a conveyor of the type noted above which includes teeth having a leading edge having stair-like steps formed therealong which engage the crop and prevent it from sliding down the teeth.

These and other objects will become more apparent from a reading of the following description together with the appended drawings.

DESCRIPTION OF THE PREFERRED EMBODIMENT

Figure 1:
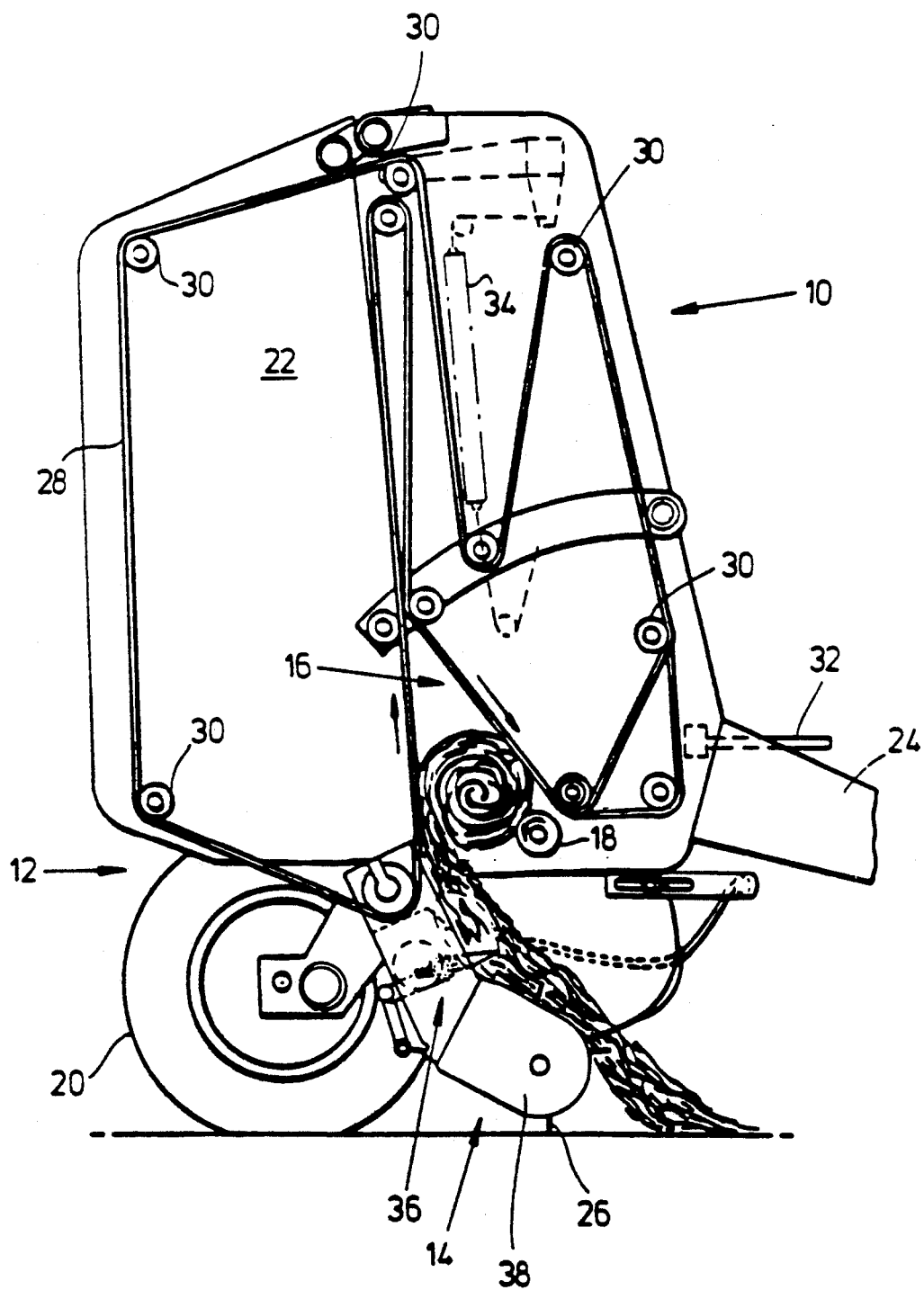
FIG. 1 is a schematic left side elevational view of a baler equipped with a conveyor including a feed fork apparatus having teeth configured in accordance with the principles of the present invention.

A harvesting machine 10, shown in FIG. 1, configured as a baler, consists in general of a frame 12, an intake arrangement 14, a bale forming chamber 16 and a roll 18 arranged as a starter roll.

The baler 10 is used to form compact, cylindrical bales (so-called round bales) of crop products such as straw, hay, grass or similar crops that are deposited in a field in windrows or are cut there. The bale forming chamber 16 is expansible and corresponds in its configuration in general with a baler described in U.S. Pat. No. 4,428,282. It is also possible to apply the invention to another configuration of a baler, in particular one with a bale forming chamber with fixed dimensions such as that disclosed in the aforementioned U.S. Pat. No. 4,580,398.

The frame 12 includes as significant components a chassis 20, side walls 22 and a draft tongue 24 for connection to an agricultural tractor.

The intake arrangement 14 is composed, in the present embodiment, of a conveyor arrangement 36 and a conveyor configured as a so-called pick up 38, that can take up crop deposited in windrows on the ground and transport it to the bale forming chamber 16. It is to be understood that a mower head having the ability to cut and discharge the crop in an upward path could be used in place of the pick up 38.

The bale forming chamber 16, as shown in FIG. 1, and therefore in its initial state, takes on the shape of a wedge, delimited at its front and rear by first and second runs of a plurality of belts 28 mounted side-by-side over several rolls 30. One or more of the rolls 30 are driven by a drive arrangement 32 which is brought into rotation from the agricultural tractor and move the belts 28 in a particular direction. The belts 28 are put under tension by deflecting to a side several of the rolls 30 together with the belts 28 running over them by a tensioning device 34 configured as a spring. As can best be seen in FIG. 1, the crop is delivered to the bale forming chamber 16 where it is brought into rotation by the first and second runs of the belts 28, which runs are moving in opposite directions in order form the core of a bale. During the operation across the field, more and more crop is transported to the bale forming chamber 16, so that the core of the bale enlarges, and deflects the surrounding belts 28 to the side. The belts 28 together with the associated rolls 30 can deflect with increasing tension at the tension device 34, until the bale forming chamber 16 has taken up nearly all the space between the side walls 22; then the baling operation must be ended.

The roll 18 is located in the lower region of the bale forming chamber 16, extends lengthwise between the two side walls 22, is oriented parallel to the axis of the rolls 30, does not change its position during the baling process, always moves close to the surface of the belts 28 and is also driven by means of the drive arrangement 32. By reason of its location, the roller 18 assumes the role of a starter roll, that is, it assists the formation process, since it helps in bringing the crop into rotation in the initially empty bale forming chamber 16. For this purpose, it moves opposite to the direction of movement of the adjacent run of the belts 28.

The principal components of the conveyor arrangement 36 are a conveyor chute 40, slots 42 formed in the chute and a feed fork apparatus including conveyor teeth 44 arranged one in each slot 42 and a tooth control 46. The conveyor arrangement 36 follows downstream of the pick up 38 and transports the crop from the conveyor arrangement 36 to the bale forming chamber 16.

The slots 42 extend in the direction of motion of the conveyor teeth 44, that is, in the direction of conveying itself; they are slightly wider that the conveyor teeth 44 in the region in which the latter penetrate through the slots 42 of the conveyor chute 40.

The conveyor teeth 44 are arranged in one or more rows parallel to each other and at least move in groups in common. In their totality, the conveyor teeth 44 extend over the entire width of the intake arrangement 14 and, except for steps 56 still to be described, are configured in the shape of a pointed wedge, whose widest part 48 always moves below the surface of the conveyor chute 40 and hence outside the conveying space, and whose point 50 moves above the conveyor chute 40 during the conveying process. The conveyor teeth 44 exhibit, with reference to the direction of crop movement along the chute 40, a leading end face 52 and a trailing end face 54 which extend generally perpendicular to the conveying surface. The leading end face 52 engages the crop, which then adheres until it is disengaged from the conveyor teeth 44 at the delivery point located downstream. The leading end face 52 applies a certain pressure to the crop, that results from the resistance of the crop to upward motion across the conveyor chute 40. The leading end face 52 does not extend in a straight line, but in the shape of a stair, which is achieved by cutting L-shaped steps 56 into the end face 52. The legs of these steps are directed at an angle of approximately 90° to each other, where the leg extending in the longitudinal direction of the conveyor teeth 44 is longer by a multiple of the length of the leg that extends perpendicular thereto.

The trailing end face 54 may be configured in a straight line or in steps 56. Since the trailing end face 54 engages the crop only at the end of the conveying process, the steps 56 may be omitted here or a lower number of them may be used. There is no objection to configuring the conveyor teeth 44 symmetrically, that is with two equal sets of steps 56 on both end faces 52 and 54.

Figure 2:
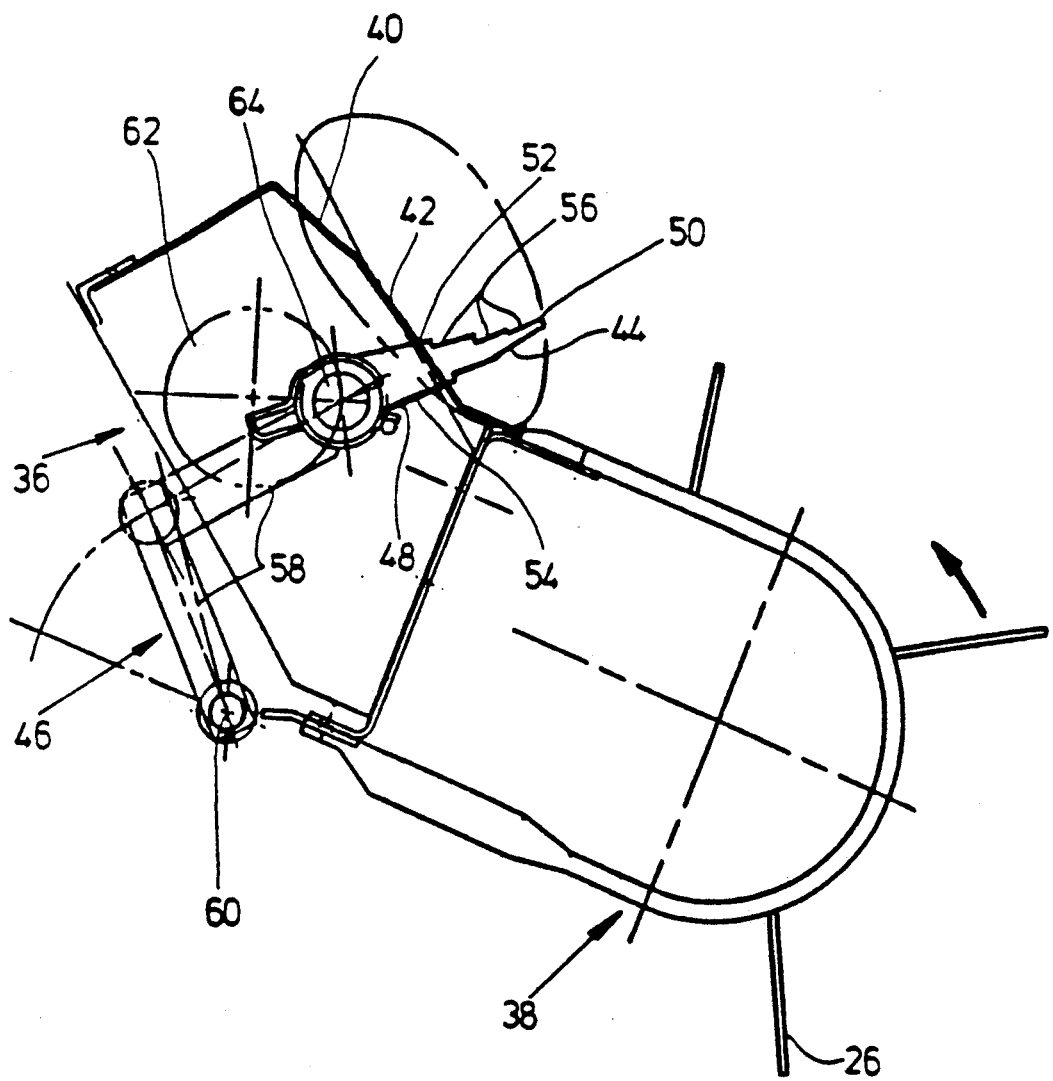
FIG. 2 is an enlarged view of the conveyor shown in FIG. 1.

During the conveying process, which occurs from right to left in FIG. 2, the feeder fork teeth 44 extend for their greatest part above the conveyor chute 40, that is, to the side opposite that of the tooth control 46. During the conveying process, the tip 50 of the conveyor teeth 44 travels in a generally oval path, and disappears below the conveyor chute 40 only during a retraction phase. At the beginning of the conveying process, the conveyor teeth 44 reach only slightly above the conveyor 38 located upstream and preferably overlap a path traveled by the pickup teeth 26.

The feed fork includes a tooth control 46 consisting of a two-armed crank 58, a bearing 60 and an eccentric 62 with a journal 64. The conveyor teeth 44 are supported on the journal 64, free to pivot and connected to the crank 58, free to pivot. The eccentric 62 transmits its rotary movement to the journal 64, so as to move the conveyor teeth 44 perpendicular to the conveyor chute 40. The position of the conveyor teeth 44 depends on the included angle between the two arms of the crank 58 at any given time. While the eccentric 62 rotates and thereby moves the conveyor teeth 44 perpendicular to the conveyor chute 40, the inclination of the conveyor teeth 44 with respect to the surface of the conveyor chute 40, is also controlled by means of the two-armed crank 58. As a result, the tip 50 of the conveyor teeth 44 travels in the indicated oval path.

Upstream of the conveyor arrangement 36, the pick-up 38 is attached and contains conventional conveyor teeth 26; hence a more detailed description of the pick-up is not necessary. It should be noted, however, that the pick-up tines may be configured in the recessed, stepped form of the conveyor teeth 44.

Further it is noted that the conveyor arrangement 36 may be used as the sole conveyor and in that case would take the crop directly from the ground.

On the basis of the foregoing description, the operation of the conveyor arrangement 36 according to the invention is as follows: The crop that has been deposited on the ground is raised by the pick-up 38 and transported by means of the tines 26 to the conveyor teeth 44, as seen in FIG. 2, upward from below and from right to left. The conveyor teeth 44 move the crop in the same direction to the inlet of the bale forming chamber 16, as indicated in FIG. 1, whereupon the tips of the teeth 44 trace the indicated curvilinear oval path. As soon as the conveyor teeth 44 begin to project through the conveyor chute 40, the crop is engaged by the steps 56 and moved away from the chute 40 to reduce sliding frictional contact therewith so that a positive conveying effect results.

I claim:

1. In a conveyor arrangement for moving cut crop including a chute having slots provided therein in an intended direction of crop movement and conveyor teeth mounted to an eccentric rotatable about an axis located beneath the chute and extending cross wise to the intended direction of crop movement, said teeth being respectively located in said slots and said eccentric being such as to cause outer tips of the teeth to follow an oval path elongated in the direction of crop movement and including a section located beneath the chute, the improvement comprising: said teeth having an end face which is leading relative to the direction of movement of the teeth during crop engagement and which is formed with several steps in a stair-like arrangement.

2. The conveyor arrangement as defined in claim 1 wherein the several steps are formed by cuts made at right angles to the surface of the leading end face.

3. The conveyor arrangement as defined in claim 1 and further including a crop pick-up arranged upstream from the chute for picking up crop from the ground and delivering it to the chute in the vicinity of the oval path traced by the tips of said teeth.

4. The conveyor as defined in claim 1 wherein the teeth have a trailing edge which is also of stair-stepped configuration.

5. In a baler including a bale forming chamber having an inlet and a conveyor mounted for moving crop into the inlet wherein the conveyor includes a chute having slots provided therein in a direction of crop movement along from a downstream end of the slots to an upstream end of the slots and a plurality of teeth mounted to an eccentric located beneath the chute and operable for moving outer ends of the teeth along respective oval paths which emerge from beneath the chute and extend thereabove at first locations adjacent the upstream ends of the slots and which go beneath the chute at second locations adjacent the downstream ends of the slots, the improvement comprising: said teeth having leading edges relative to their direction of travel from the downstream to the upstream ends of said slots, which leading edges have a stepped configuration.

6. The baler defined in claim 4 and further including a pick-up mounted to deliver cut crop to the chute in the vicinity of the downstream ends of the slots; and said pick-up including crop delivery elements which move along paths which overlap downstream portions of said oval paths.

7. The baler defined in claim 1 wherein said teeth have a trailing edge which is also of a stepped configuration.

* * * * *